March 7, 1967  J. A. PETRIE  3,307,775
COMPRESSORS FOR GAS TURBINE JET PROPULSION ENGINES
Filed Aug. 25, 1965  2 Sheets-Sheet 1
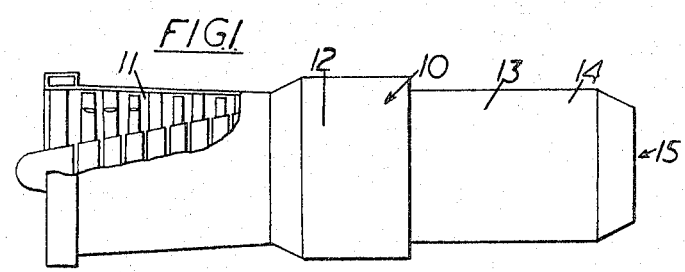
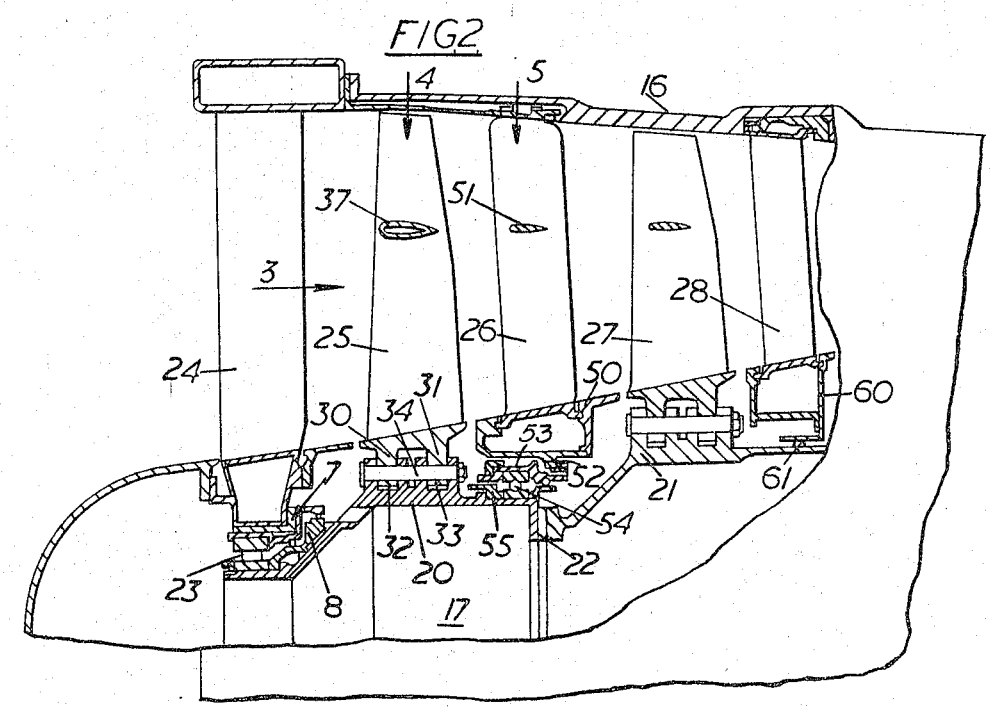
Inventor
James Alexander Petrie
By
Cushman, Darby & Cushman
Attorneys

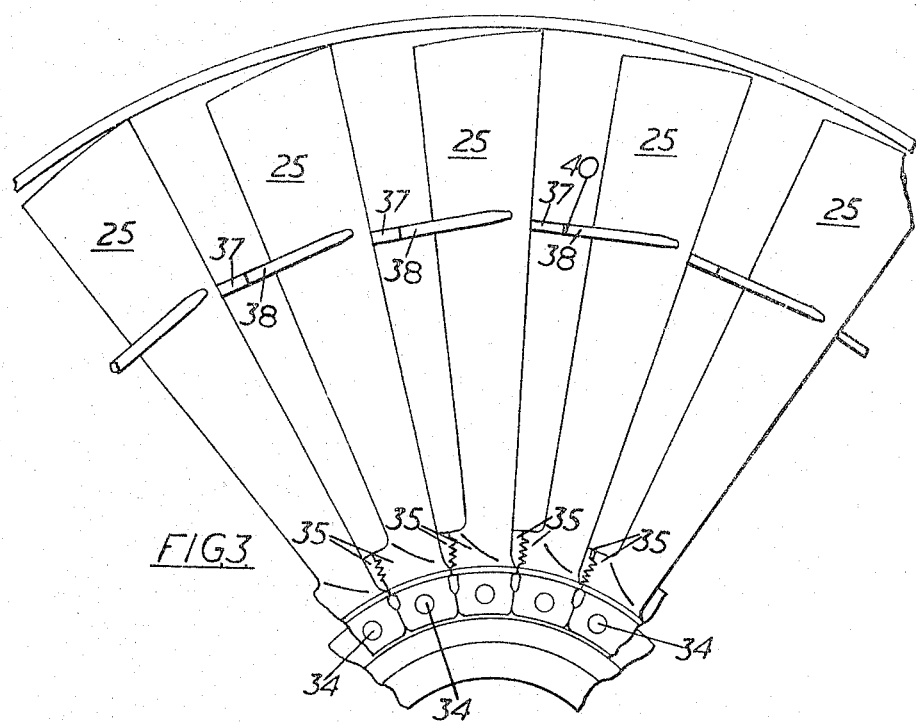
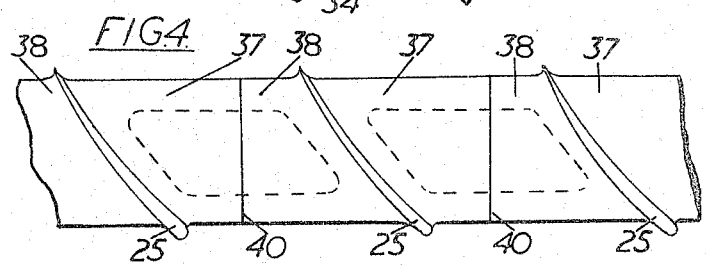
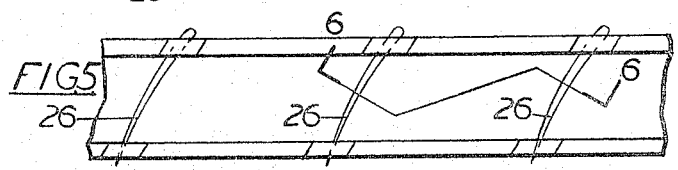
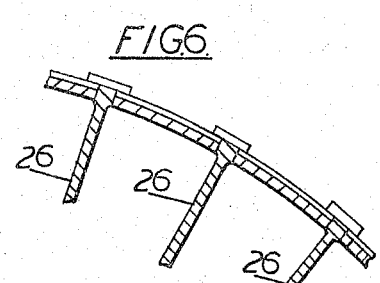

United States Patent Office 3,307,775
Patented Mar. 7, 1967

3,307,775
COMPRESSORS FOR GAS TURBINE JET PROPULSION ENGINES
James Alexander Petrie, Littleover, England, assignor to Rolls-Royce Limited, Derby, England, a British company
Filed Aug. 25, 1965, Ser. No. 482,509
Claims priority, application Great Britain, Sept. 4, 1964, 36,436/64
12 Claims. (Cl. 230—122)

This invention concerns axial flow compressors for gas turbine jet propulsion engines.

Bird ingestion is a serious problem for aircraft operator where gas turbine engines are employed since a bird can cause serious damage to the engines, often resulting in the engine becoming useless until major components have been repaired or replaced. The axial flow compressors of axial flow gas turbine engines suffer the worst damage as a result of bird ingestion. The first stage and, to a lesser degree the second stage, take the brunt of the impact and damage caused by the ingested birds and these stages may often be partially or almost completely destroyed.

To deal with this problem it is desirable to increase the strength of the compressor components with the minimum increase in weight or cost.

According therefore to the present invention there is provided an axial flow compressor for a gas turbine jet propulsion engine comprising an external casing within which a rotor is rotatably mounted, the radially outer ends of the first stage stator blades being attached to the casing and the radially inner ends thereof being provided with a common annular abutment disposed adjacent a further abutment rotatably mounted on said rotor whereby axial movement of said stator blades is restricted.

By limiting axial movement of the first stage stator blades, undue stress at their point of fixture to the casing is prevented, and the risk of fracture is substantially reduced.

Preferably, the common annular abutment is disposed downstream of said further abutment whereby upstream axial movement of said stator blades is restricted.

In a preferred embodiment the further abutment is rotatably mounted on said rotor by a bearing which is sealed to prevent contamination by dirt.

In a preferred embodiment the first stage rotor blades are brazed or welded to said common annular abutment and to a common outer ring and are interconnected between their radially inner and outer ends by struts of aerofoil section.

Preferably, the first stage rotor blades are fixed to the rotor by dowel pins. Thus each blade may be provided with axially spaced lugs which are received within spaced groves in said rotor, a common pin extending through the lugs and grooves to attach each blade to the rotor.

In a preferred embodiment the radially inner root portions of said rotor blades are provided with coperating serrations such that they are rigidly interconnected. Due to this rigid interconnection, the rotor blades are prevented from rocking circumferentially when they are struck by an object. Thus the bending strength of the blades may be used in full to resist the blow experienced by the blades.

All the first stage rotor blades are preferably interconnected between their radially inner and outer ends by struts of aerofoil section.

The second stage rotor blades may be similar to the first stage rotor blades in respect of their fixing and interconnecting.

In a preferred embodiment inlet guide vanes are provided which support a main bearing within which the rotor is rotatably mounted, the outer race of the bearing being provided with an abutment which cooperates with an abutment provided on the rotor to limit axial movement of the inlet guide vanes relative to the rotor.

The invention also includes a gas turbine jet propulsion engine provided with a compressor as set forth above.

The invention is illustrated, merely by way of example, in the accompanying drawings, in which:

FIGURE 1 is a cut away view of a gas turbine jet propulsion engine provided with a compressor in accordance with the present invention, FIGURE 2 is an enlarged view of part of the engine of FIGURE 1 illustrating the compressor in more detail, FIGURES 3, 4 and 5 are views of parts of the compressor of FIGURE 2 taken in the directions of arrows 3, 4 and 5 respectively of that figure, and FIGURE 6 is a part sectional view of the component of FIGURE 5 taken on section line 6—6 of that figure.

Referring to the drawings a gas turbine jet propulsion engine 10 comprises an axial flow compressor 11, combustion equipment 12, turbines 13 and a jet pipe 14 terminating in a propulsion nozzle 15 through which gases are exhausted to atmosphere.

The compressor 11 comprises a casing 16 within which a rotor 17 is rotatably mounted. Rotor 17 includes two hubs 20, 21 connected by a coupling 22, and is rotatably mounted within a bearing 23 supported from casing 16 by a set of inlet guide vanes 24.

The outer race of bearing 23, is provided with an annular abutment member 7 which is disposed upstream of an annular abutment member 8 provided on rotor 17. Members 7 and 8 are normally axially spaced but, should an object strike inlet guide vanes 24, members 7 and 8 abut one another and thus axial movement of the inlet guide vanes 24 is limited by the abutment member 8.

Disposed in axial flow series behind the set of inlet guide vanes 24 are a set of first stage titanium rotor blades 25, a set of first stage steel stator blades 26, a set of second stage titanium rotor blades 27 and a set of second stage titanium or steel stator blades 28. Further stages are provided, but these are not of interest in the present matter.

The first stage rotor blades 25 have their radially inner ends provided with two axially spaced lugs 30, 31, which engage with corresponding annular grooves 32, 33 in hub 20. A dowel pin 34 is provided for each blades 25 and extends through lugs 30, 31 and grooves 32, 33 to fix each blade to the hub 20. The pins 34 are a close fit in the lugs 30, 31 and in the apertures formed in hub 20 through which they pass such that the blades 25 are fixed rigidly to hub 20. Thus the relatively loose fittings usually provided for compressor rotor blades, allowing the blades some free but restricted rolling movement, are not employed and a consequently stronger construction is obtained.

As clearly seen from FIGURE 3 the blades 25 are provided with root portions 35 at their radially inner ends, the abutting faces of adjacent root portions being serrated and meshing one with the other such as to rigidly lock the blades 25 together. The blades 25, being rigidly locked together, resist deflection in a circumferential direction.

As seen in FIGURES 3 and 4 the blades 25 are provided, adjacent their mid-span, with struts 37, 38 of aerofoil section extending on either side thereof. Adjacent struts 37, 38 of adjacent blades 25 are welded together as at 40 to thus rigidly interconnect all the blades 25 at their mid-span. Thus the blades are strengthened and any local loading is distributed circumferentially through all the blades.

The second stage rotor blades 27 are formed in exactly the same way as the first stage rotor blades 25 and thus their construction will not be described in detail. It will be appreciated that the construction of the rotor blades is such as to strengthen them appreciably.

Referring to the first stage stator blades 26, these are brazed into slots formed in casing 16, at their radially outer ends, and are brazed into a common steel annulus 50 at their radially inner ends. Struts 51 of aerofoil section interconnect the blades 26 at their mid-spans to thereby strengthen them and distribute any local loading through all the blades.

Annulus 50 is provided at its radially innermost section with an annular abutment 52 which is axially spaced from but is closely adjacent a face of an annular abutment member 53. Member 53 is mounted on the outer race of a ball bearing 54 the inner race of which is fixed on hub 20. An annular cup member 55 surrounds the inner race and extends axially of the bearing 54, being in sealing contact with member 53, to thereby seal bearing 54 from contamination by foreign matter e.g. dirt.

During normal operation of the compressor, bearing 54 and member 53 rotate with the rotor 17, no relative rotation between the inner and outer races of the bearing occurring. However, should a bird be ingested into the compressor, the flexing reaction upon blades 26 will cause them to be urged axially forwardly, until abutment 52 abuts the abutment member 53. Member 53 and the outer race of bearing 54 then stops rotating and remains static with abutment 52. Thus axial movement of blades 26 under stress is restricted. Stress at the radially outer ends of the blades (where they are fixed) is thus reduced and the risk of the blades being fractured is reduced.

Blades 28 are formed rather more conventionally in that they are fixed, without brazing, in casing 16 and in an annulus 60. The annulus 60 makes sealing contact with the hub 21 by a seal 61.

It will be appreciated that all design features heretofore described have been intended to strengthen the compressor with as little weight penalty as possible. As well as arranging for the compressor blades to withstand the impact of ingested birds by the strengthening devices set out above, it is also desirable to arrange for the ingested bird to be cut into small sections at the earliest possible opportunity whereby subsequent blades suffer less damage. To this end, the number of inlet guide vanes 24 is increased and their leading edges are sharpened whereby the sizes of the pieces of bird passing through the inlet guide vanes are reduced. The spacing between the inlet guide vanes determines the maximum size of bird which can pass on to subsequent stages.

The number of stator blades is increased compared with conventional compressors and their chords are reduced to provide sharper leading edges whilst retaining their standard profile and space/chord ratio. The increased number of blades limits the size of the pieces of bird passed by the stator blades and the reduced chord increases the axial clearance between stators and rotors. The increased clearance reduces the risk of fouling between the stator and rotor blades when these are deflected.

I claim:

1. An axial flow compressor for a gas turbine jet propulsion engine comprising an external casing, a rotor rotatably mounted in said casing, first stage stator blades having radially inner and outer ends, the radially outer ends being attached to the casing, a common annular abutment interconnecting said radially inner ends, and a further abutment rotatably mounted on said rotor and disposed adjacent said common annular abutment whereby axial movement of said stator blades is restricted.

2. An axial flow compressor for a gas turbine jet propulsion engine comprising an external casing, a rotor rotatably mounted within said casing, first stage stator blades having radially inner and outer ends the radially outer ends being attached to the casing, a common annular abutment interconnecting said radially inner ends, and a further abutment rotatably mounted on said rotor upstream of but adjacent said common annular abutment whereby upstream axial movement of said stator blades is restricted.

3. An axial flow compressor for a gas turbine jet propulsion engine comprising an external casing, a rotor rotatably mounted in said casing first stage stator blades having radially inner and outer ends the radially outer ends being attached to the casing, a common annular abutment interconnecting said radially inner ends, a further abutment and a bearing sealed to prevent contamination by dirt, rotatably mounting said further abutment on said rotor adjacent said common annular abutment, whereby axial movement of said stator blades is restricted.

4. An axial flow compressor for a gas turbine jet propulsion engine comprising an external casing, a rotor rotatably mounted in said casing, first stage stator blades having radially inner and outer ends, struts of aerofoil cross section interconnecting said first stage stator blades between the radially inner and outer ends, the radially outer ends being attached to the casing, a common annular abutment interconnecting said radially inner ends, and a further abutment rotatably mounted on said rotor and disposed adjacent said common annular abutment whereby axial movement of said stator blades is restricted.

5. An axial flow compressor for a gas turbine jet propulsion engine comprising an external casing, a rotor rotatably mounted in said casing, first stage rotor blades, dowel pins connecting said rotor blades to said rotor, first stage stator blades having radially inner and outer ends, the radially outer ends being attached to the casing, a common annular abutment interconnecting said radially inner ends, and a further abutment rotatably mounted on said rotor and disposed adjacent said common annular abutment whereby axial movement of said stator blades is restricted.

6. An axial flow compressor for a gas turbine jet propulsion engine comprising an external casing, a rotor rotatably mounted in said casing, first stage rotor blades, axially spaced grooves on said rotor, axially spaced lugs on each rotor blade disposed within said grooves, a dowel pin extending through and connecting each set of lugs to said grooves, first stage stator blades having radially inner and outer ends, the radially outer ends being attached to the casing, a common annular abutment interconnecting said radially inner ends, and a further abutment rotatably mounted on said rotor and disposed adjacent said common annular abutment whereby axial movement of said stator blades is restricted.

7. An axial flow compressor for a gas turbine jet propulsion engine comprising an external casing, a rotor rotatably mounted in said casing first stage rotor blades, radially inner root portions of said rotor blades provided with serrations which co-operate to rigidly interconnect said rotor blades, first stage stator blades having radially inner and outer ends, the radially outer ends being attached to the casing, a common annular abutment interconnecting said radially inner ends, and a further abutment rotatably mounted on said rotor and disposed adjacent said common annular abutment whereby axial movement of said stator blades is restricted.

8. An axial flow compressor for a gas turbine jet propulsion engine comprising an external casing, a rotor rotatably mounted in said casing, first stage rotor blades, radially inner and outer ends to said rotor blades, struts of aerofoil section interconnecting said blades between the ends thereof, first stage stator blades having radially inner and outer ends, the radially outer ends being attached to the casing, a common annular abutment interconnecting said radially inner ends, and a further abutment rotatably mounted on said rotor and disposed adjacent said common annular abutment whereby axial movement of said stator blades is restricted.

9. An axial flow compressor for a gas turbine jet propulsion engine comprising an external casing, a rotor rotatably mounted in said casing, first stage rotor blades, dowel pins connecting said blades to the rotor, abutting serrated root portions of said rotor blades co-operating to interconnect said rotor blades, struts of aerofoil section interconnecting said rotor blades between their ends, first stage stator blades having radially inner and outer ends, the radially outer ends being attached to the casing, a common annular abutment interconnecting said radially inner ends, and a further abutment rotatably mounted on said rotor and disposed adjacent said common annular abutment whereby axial movement of said stator blades is restricted.

10. A compressor as claimed in claim 9 including second stage rotor blades mounted in a manner similar to said first stage rotor blades.

11. An axial flow compressor for a gas turbine jet propulsion engine comprising an external casing, a rotor, a main bearing within which the rotor is rotatably mounted, inlet guide vanes supporting said main bearing, an abutment on the outer race of the bearing, an abutment provided on the rotor co-operating with the abutment on the bearing to limit axial movement of the inlet guide vanes relative to the rotor, first stage stator blades having radially inner and outer ends, the radially outer ends being attached to the casing, a common annular abutment interconnecting said radially inner ends, and a further abutment rotatably mounted on said rotor and disposed adjacent said common annular abutment whereby axial movement of said stator blades is restricted.

12. In a gas turbine jet propulsion engine, an axial flow compressor comprising an external casing, a rotor rotatably mounted in said casing, first stage stator blades having radially inner and outer ends, the radially outer ends being attached to the casing, a common annular abutment interconnecting said radially inner ends, and a further abutment rotatably mounted on said rotor and disposed adjacent said common annular abutment whereby axial movement of said stator blades is restricted.

References Cited by the Examiner

UNITED STATES PATENTS

| 1,345,642 | 7/1920 | Schmidt | 253—77 |
| 2,605,996 | 8/1952 | Sturgess | 253—77 |
| 2,912,157 | 11/1959 | Taylor | 253—77.2 |
| 2,951,631 | 9/1960 | Gregory | 230—122 |

FOREIGN PATENTS 1,256,467    2/1961    France.

DONLEY I. STOCKING, *Primary Examiner.*

H. F. RADUAZO, *Assistant Examiner.*